United States Patent Office 2,847,428
Patented Aug. 12, 1958

2,847,428

PREGNAN-2-OL-3,20-DIONE, ALLOPREGNAN-2-OL-3,20-DIONE, ESTERS THEREOF, AND PREPARATION THEREOF

Robert L. Clarke, Elsmere, N. Y., assignor to Sterling Drug Inc., New York, N. Y., a corporation of Delaware No Drawing. Application October 27, 1955
Serial No. 543,273

7 Claims. (Cl. 260—397.4)

I have invented a new class of steroidal substances, namely pregnan-2-ol-3,20-dione, allopregnan-2-ol-3,20-dione and esters thereof, and a process for their preparation, said new class of steroidal substances having the formula

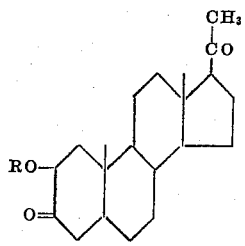

wherein R is hydrogen or an acyl group. These compounds possess cortical hormone inhibitory properties, which indicates their usefulness in combatting hormonal imbalance due to the presence of excessive amounts of cortical hormones.

The compounds of my invention are prepared by catalytically hydrogenating 2-hydroxyprogesterone (4-pregnen-2-ol-3,20-dione) or an ester thereof, thus obtaining my new compounds in 2-hydroxy, or 2-acyloxy form, respectively. There are obtained both possible stereoisomers involving the hydrogen atom introduced at $C_5$ by reduction of the double bond, namely, pregnan-2-ol-3,20-dione and allopregnan-2-ol-3,20-dione or esters thereof, respectively.

The intermediate 2-hydroxy- or acetoxyprogesterone which I use in obtaining my new compounds is prepared by means of the reaction of progesterone with two equivalents of lead tetraacetate. This reaction produces 2-acetoxyprogesterone together with other products including 2,21-diacetoxyprogesterone and 21-acetoxy-1,4-pregnadiene-3,20-dione. The three named products can readily be separated by adsorbing the mixture of products on a column of silica gel and eluting the adsorbed material with an ether-petroleum ether mixture. The 2-acetoxyprogesterone is eluted first and is obtained in about 8% pure yield.

The 2-acetoxyprogesterone thus obtained can then be catalytically reduced directly to compounds of the invention, 2-acetoxypregnane-3,20-dione and 2-acetoxyallopregnane-3,20-dione. Alternatively, the 2-acetoxyprogesterone can be saponified to 2-hydroxyprogesterone and the latter then catalytically hydrogenated to give pregnan-2-ol-3,20-dione and allopregnan-2-ol-3,20-dione. The catalyst used in the hydrogenation can be any one of those commonly used for reduction of ethylenic double bonds. Supported palladium catalysts have been found to be particularly useful for this purpose, and palladium on calcium carbonate is a preferred type of catalyst.

Esters of pregnan-2-ol-3,20-dione and allopregnan-2-ol-3,20-dione other than the acetate can readily be prepared either by direct esterification with an acyl halide or an acid anhydride, or by similar esterification of 2-hydroxyprogesterone and catalytic hydrogenation of the resulting 2-acyloxyprogesterone. The nature of the acid moiety of the esters is not critical provided it is devoid of substituents which interfere with the esterification reaction or with the desirable physiological properties of the steroid molecule. Preferred types of esters contemplated besides the acetate are those of other lower-alkanoic acids such as formic acid, propionic acid and butyric acid, lower-alkanedicarboxylic acids such as oxalic acid, malonic acid and succinic acid, and monocyclic aromatic carboxylic acids such as benzoic acid, p-nitrobenzoic acid, 3,5-dinitrobenzoic acid and the like.

The reactions involved in the synthesis of compounds of my invention are outlined in the following flow sheet (where R' stands for an acyl radical).

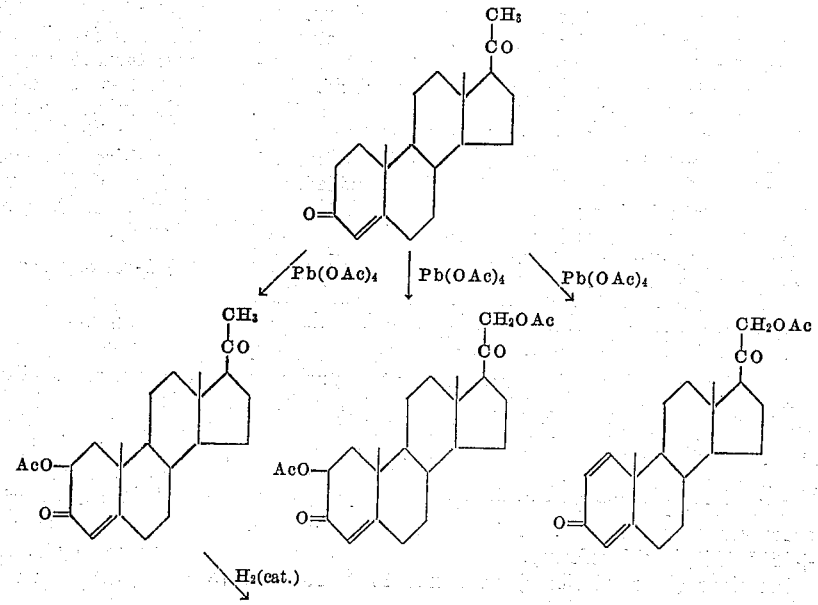

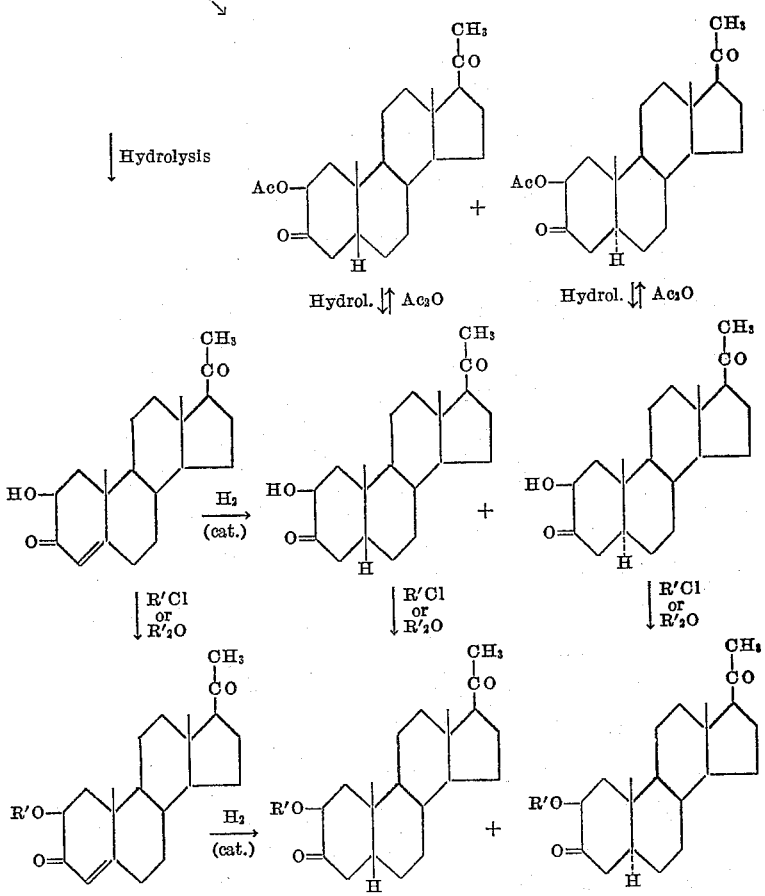

The following examples will further illustrate my invention.

EXAMPLE 1

(a) Acetoxylation of progesterone

To a solution of 170 g. (0.33 mole) of 85% lead tetraacetate in 1800 ml. of glacial acetic acid at 70° C. was added, all at once and with stirring, a solution of 50 g. (0.16 mole) of progesterone in 200 ml. of glacial acetic acid at approximately 70° C. The reaction mixture was heated for six hours at 85–90° C. Most of the solvent was removed from the reaction mixture in vacuo, 1 liter of water was added to the residue, and the mixture was extracted three times with ether. The ether extracts were washed five times with water and then with sodium bicarbonate solution to remove all residual acetic acid. The ether solution was dried briefly over anhydrous sodium sulfate and then overnight over anhydrous calcium sulfate.

The ether solution was adjusted to a 1 liter volume, 1 liter of petroleum ether (Skellysolve A) was added, and the supernatant liquid was decanted from the precipitated gum onto a chromatographic column containing 1 kg. of 100–200 mesh silica gel which had previously been treated with a 1:1 ether-petroleum ether mixture. The residual gum was dissolved in ether, an equal volume of petroleum ether added, and the process repeated until all material was on the column, 10 liters of solvent being required. An additional 10 liters of the same solvent mixture was passed through the column. The column was then eluted with solvent containing 60% ether and 40% petroleum ether. From liters of eluate numbered 29 through 36 there was isolated, after one recrystallization from ether and three recrystallizations from methanol, 4.9 g. of 2-acetoxyprogesterone. M. P. 198–199.5° C., $[\alpha]_D^{25}=+158°$ (1% in chloroform).

Fractions (liters of eluate) numbered 37 through 64 gave 33 g. of colorless solid material, the infra red spectrum of which indicated it to be largely 2,21-diacetoxyprogesterone.

The material obtained from fractions (liters of eluate) numbered 79–85 and 113–116 was combined, washed with a small quantity of ether and added to the material from fractions numbered 86–112. The combined material was recrystallized from an acetone-ether mixture to give 3.0 g. of 21-acetoxy-1,4-pregnadiene-3,20-dione, M. P. 202.5–204° C., $[\alpha]_D^{25}=+125.6°$ (1% in ethanol).

(b) 4-pregnen-2-ol-3,20-dione

A mixture of 1.70 g. of 2-acetoxyprogesterone, obtained as described above in part (a), 1.25 g. of potassium bicarbonate, 60 ml. of methanol and 15 ml. of water was heated at reflux for eighty minutes. The reaction mixture was concentrated, and the residue was extracted with five portions of ether. The ether extracts were dried and concentrated, causing crystallization of 1.05 g. of 2-hydroxyprogesterone (4-pregnen-2-ol-3,20-dione), M. P. 185–187° C., $[\alpha]_D^{25}=+194°$ (1% in ethanol).

(c) 2-acetoxypregnane-3,20-dione and 2-acetoxyallopregnane-3,20-dione

A solution of 5.4 g. of 2-acetoxyprogesterone in 150 ml. of absolute ethanol was hydrogenated at room temperature and 54 lbs. per sq. inch pressure in the presence of 5.4 g. of 2% palladium on calcium carbonate catalyst. In twenty-five minutes, 1.25 moles of hydrogen was absorbed. The mixture was filtered to remove the catalyst, the filtrate was concentrated, and the residue was treated with 27 ml. of pyridine and 20 ml. of acetic anhydride at room temperature for about fifteen hours in order to reacetylate any material which might have undergone alcoholysis of the acetoxy group. Pyridine and acetic anhydride were removed in vacuo, the residual oil was dissolved in ether and the ether solution washed once with 10% potassium carbonate solution, twice with dilute sulfuric acid and twice with water. Concentration of the ether solution gave a partially solidified mass which was chromatographed on a column containing 500 g. of 100-200 mesh silica gel. The material was added to the column in a solution containing 20% ether and 80% petroleum ether (Skellysolve A), and the absorbed material was eluted with gradually increasing concentrations of ether in petroleum ether. Eluates from 40% ether contained 2-acetoxypregnane-3,20-dione of which there was obtained 850 mg., M. P. 146-152° C., after recrystallization from petroleum ether (Skellysolve B).

Further elution of the column with 40% ether and recrystallization of the solid material from petroleum ether gave 2.5 g. of 2-acetoxyallopregnane-3,20-dione, M. P. 124-126° C., $[\alpha]_D^{25} = +99.0°$ (1% in chloroform).

*Analaysis.*—Calcd. for $C_{23}H_{34}O_4$: C, 73.76; H, 9.15. Found: C, 74.00; H, 8.91.

2-acetoxyallopregnane-3,20-dione was found to have adrenal cortical hormone inhibitory activity of about 40% at a dose level of 14 mg./kg. of body weight and about 55% at a dose level of 70 mg./kg. when measured by the liver glycogen deposition test in adrenalectomized male rats, injected first with a standard dose of cortisone and then with the test compound.

EXAMPLE 2

*Pregnan-2-ol-3,20-dione and allopregnan-2-ol-3,20-dione*

A solution of 1.30 g. of 2-hydroxyprogesterone, prepared as described above in Example 1, part (b), in 150 ml. of absolute ethanol was hydrogenated at room temperature and 41 lbs. per sq. inch pressure in the presence of 1.3 g. of palladium on calcium carbonate catalyst. After hydrogenation was complete (one-half hour) the catalyst was removed by filtration, the filtrate evaporated to dryness, and the solid residue chromatographed on a column of 50 g. of 100-200 mesh silica gel using a solvent containing 25% ether and 75% petroleum ether (Skellysolve A). The column was eluted with solvent mixtures of gradually increasing eluting power. A 45% ether-55% petroleum ether mixture brought out about 0.5 g. of material which, when recrystallized from acetone, gave 0.18 g. of allopregnan-2-ol-3,20-dione, M. P. 201-204° C.

Elution of the column with pure ether and ether containing 5% of acetone brought out about 0.2 g. of solid material which, when recrystallized from acetone, gave 0.15 g. of pregnan-2-ol-3,20-dione, M. P. 115-122° C.

Samples of allopregnan-2-ol-3,20-dione and pregnan-2-ol-3,20-dione were separately acetylated with acetic anhydride in pyridine. The products obtained compared favorably in physical properties with the 2-acetoxyallopregnane-3,20-dione and 2-acetoxypregnane-3,20-dione obtained in Example 1, part (c).

EXAMPLE 3

2-acetoxypregnane-3,20-dione heated with potassium bicarbonate in aqueous methanol gives pregnan-2-ol-3,20-dione. Pregnan-2-ol-3,20-dione reacts with propionic anhydride, succinic anhydride or benzoyl chloride to give, respectively, 2-propionoxypregnane-3,20-dione, 2-(β-carboxypropionoxy)pregnane-3,20-dione or 2-benzoyloxypregnane-3,20-dione.

EXAMPLE 4

2-acetoxyallopregnane-3,20-dione heated with potassium bicarbonate in aqueous methanol gives allopregnan-2-ol-3,20-dione. Allopregnan-2-ol-3,20-dione reacts with propionic anhydride, succinic anhydride or benzoyl chloride to give, respectively, 2-propionoxyallopregnane-3,20-dione, 2-(β-carboxypropionoxy)allopregnane-3,20-dione or 2-benzoyloxyallopregnane-3,20-dione.

The compounds of my invention can be prepared for use by dissolving them in a pharmaceutically acceptable oil vehicle or aqueous suspension for intraperitoneal or intramuscular injection in a manner conventionally employed for steroidal hormones.

This application is a continuation-in-part of my copending application, Serial No. 381,516, filed September 21, 1953, now abandoned.

I claim:

1. A compound having the formula

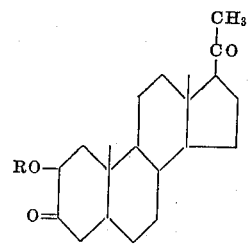

wherein R is selected from the group consisting of hydrogen and acyl groups derived from acids selected from the groups consisting of lower-alkanoic acids, lower-alkanedicarboxylic acids and monocarbocyclic aromatic carboxylic acids.

2. Pregnan-2-ol-3,20-dione.
3. Allopregnan-2-ol-3,20-dione.
4. 2-acetoxypregnane-3,20-dione.
5. 2-acetoxyallopregnane-3,20-dione.
6. The process for preparing a compound having the formula

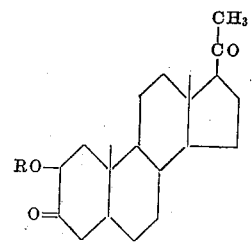

wherein R is selected from the group consisting of hydrogen and acyl groups derived from acids selected from the groups consisting of lower-alkanoic acids, lower-alkanedicarboxylic acids and monocarbocyclic aromatic carboxylic acids, which comprises catalytically hydrogenating a 2-substituted-progesterone having the formula

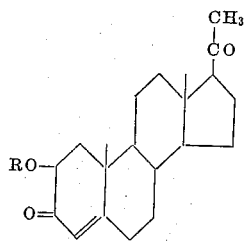

wherein R is identical with its selection above, and separating the 2-substituted pregnane-3,20-dione and 2-substituted allopregnane-3,20-dione thus formed.

7. The process which comprises catalytically hydrogenating 2-acetoxy-4-pregnene-3,20-dione and separating the 2-acetoxypregnane-3,20-dione and the 2-acetoxyallopregnane-3,20-dione thus formed.

References Cited in the file of this patent

UNITED STATES PATENTS

| | | |
|---|---|---|
| 2,280,828 | Inhoffen | Apr. 28, 1942 |
| 2,602,803 | Kaufmann | July 8, 1952 |

FOREIGN PATENTS

| | | |
|---|---|---|
| 900,342 | Germany | Dec. 21, 1953 |